July 1, 1969

DHU AINE J. DAVIS 3,453,575

ELECTRICAL COIL

Filed Aug. 8, 1968

INVENTOR
DHU AINE J. DAVIS
BY Hofgren, Wegner, Allen, Stellman & McCord.

ATTORNEYS.

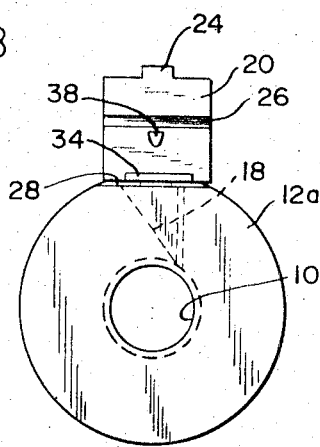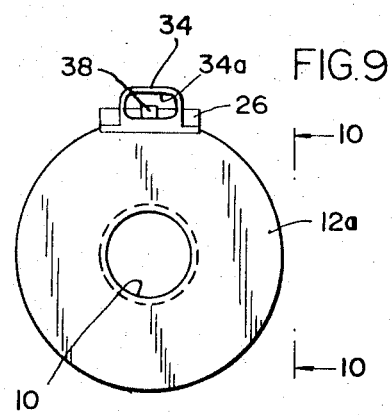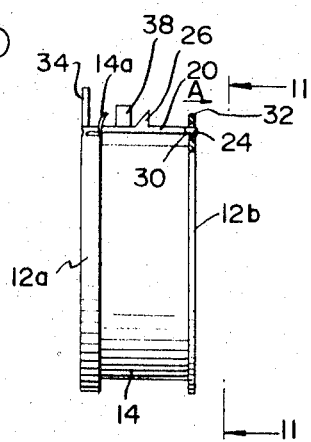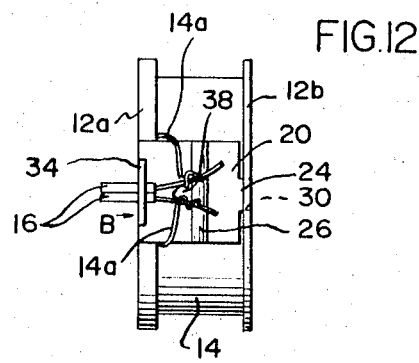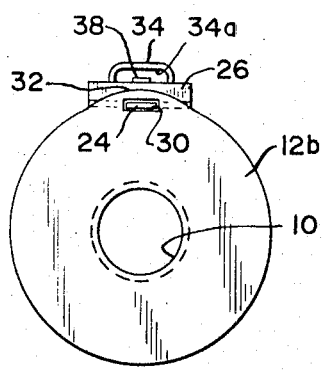

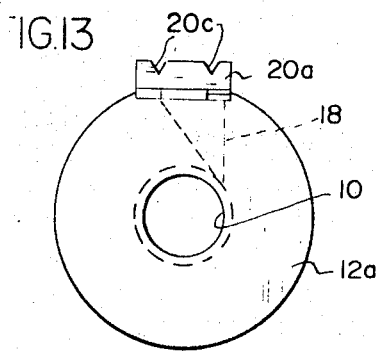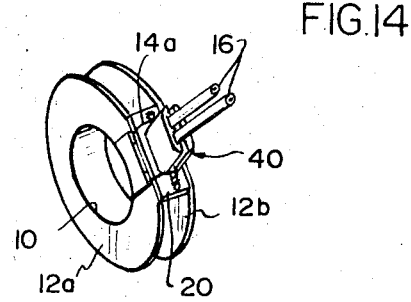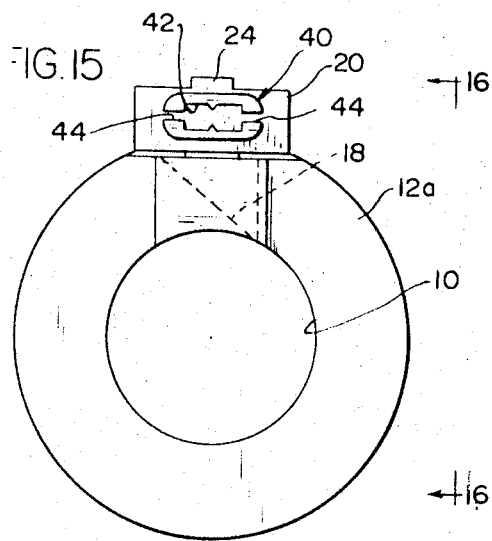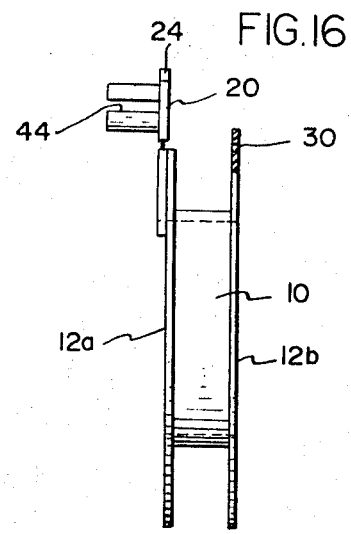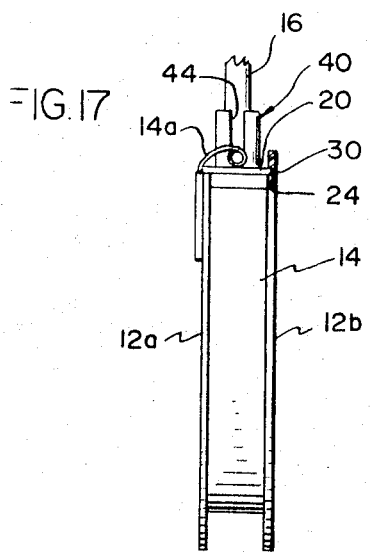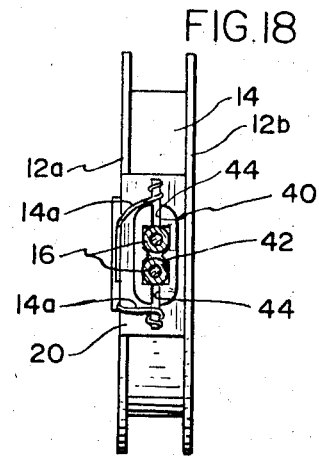

United States Patent Office 3,453,575
Patented July 1, 1969

3,453,575
ELECTRICAL COIL
Dhu Aine J. Davis, Wheaton, Ill., assignor to Hermetic Coil Co., Inc., a corporation of Connecticut
Continuation-in-part of application Ser. No. 660,552, July 19, 1967. This application Aug. 8, 1968, Ser. No. 755,762
Int. Cl. H01f 15/10
U.S. Cl. 336—192
15 Claims

ABSTRACT OF THE DISCLOSURE

An electrical coil which has a bobbin configuration with a terminal mounting means. The terminal mounting means includes a connector plate formed integrally with one of the end discs of the bobbin and movable between a first position extending outwardly to permit a coil to be wound on the bobbin and a second position extending toward the other bobbin end disc for engagement therewith spanning the bobbin channel within which the coil is wound. The connector plate has means for receiving either the end wires from a wound coil or lead wires for connection to the end wires, and means are provided for securing the connector plate to the other end disc.

BACKGROUND OF THE INVENTION

This is a continuation-in-part of my copending application, Ser. No. 660,552, entitled "Bobbin" and filed July 19, 1967, now abandoned, which is a continuation-in-part of my parent application, Ser. No. 615,200, entitled "Bobbin," filed Feb. 10, 1967, now abandoned.

As seen in my Patent No. 3,200,444 for an Injection Molding Apparatus for Encapsulating Deformable Articles and my application, Ser. No. 493,731, filed Oct. 6, 1965, for an Electrical Coil, one type of electrical coil has a bobbin configuration with a coil receiving central portion and a pair of end discs at either end of the central portion defining a coil receiving channel. A coil is wound on the central portion of the coil form within the channel and the ends of the wire of the coil extend outwardly from the wound coil. A separate terminal mounting member is positioned against the outer surface of the winding and receives terminal leads which are connected to the ends of the wire of the coil. The terminal mounting member of such a coil, being a relatively small and separate member, is sometimes difficult to handle and to position against the outer surface of the winding prior to encapsulating the coil. The present invention is directed to a solution to this problem by forming a terminal mounting member integral with the bobbin, the terminal mounting member permitting the coil to be wound onto the bobbin and providing a means to position the wire ends of the winding for connection to appropriate terminal leads. The integral mounting member is prepositioned and eliminates the tedious manipulation heretofore necessary to position the ends of the coil wire for connection with the terminal leads.

SUMMARY OF THE INVENTION

The principal object of this invention, therefore, is to provide an improved bobbin structure for an electrical coil.

Another object of this invention is to provide an electrical coil of the character described having a terminal mounting member formed integrally with the bobbin and in a position to receive the wire ends for connection with appropriate terminal leads.

A further object is to provide means on the integrally formed terminal mounting member for affixing the wire ends thereto by heat sealing.

Still another object of this invention is to provide an electrical coil of the character described wherein the integrally formed terminal mounting member is positioned to permit the coil to be wound on the bobbin and is sufficiently flexible to be turned across the bobbin spanning the winding to provide a compact electrical coil to facilitate subsequent encapsulation thereof.

Yet a further object of the invention is to provide an electrical coil of the character described wherein the terminal mounting member has means for receiving terminal leads in position for connection with the end wires from the wound coil.

Other objects, features and advantages of the invention will readily be apparent from the following specification and from the accompanying drawings.

DESCRIPTION OF THE DRAWINGS

FIG. 8 is an elevation view of another form of a bobbin embodying the invention, before a coil is wound thereon;

FIG. 9 is an elevation view similar to that of FIG. 8 with the integrally formed terminal mounting member completely spanning the wound coil and affixed to the end discs of the bobbin;

FIG. 10 is an elevation view taken generally in the direction of line 10—10 of FIG. 9 with a coil wound on the bobbin and with the winding end wires in a position for connection to terminal leads;

FIG. 11 is an elevation view taken generally in the direction of line 11—11 of FIG. 10;

FIG. 12 is a top plan view of the coil of FIG. 10 with the terminal leads connected to the winding end wires;

FIG. 13 is an elevation view of a slightly modified form of the invention shown in FIGS. 1 through 7;

FIG. 14 is a perspective view of a further form of an electrical coil embodying the invention, with the integrally formed terminal mounting member completely spanning the wound coil and affixed to the end discs of the bobbin;

FIG. 15 is en elevation view of the bobbin of the form of invention shown in FIG. 14, before a coil is wound thereon;

FIG. 16 is an elevation view taken generally in the direction of line 16—16 of FIG. 15;

FIG. 17 is an elevation view similar to that of FIG. 16 with the integrally formed terminal mounting member completely spanning the wound coil and affixed to the end discs of the bobbin, with lead wires received by the terminal mounting member and connected to the end wires from the wound coil; and FIG. 18 is a top plan view of the coil of FIG. 17.

DETAILED DESCRIPTION OF THE INVENTION

Figure 1:
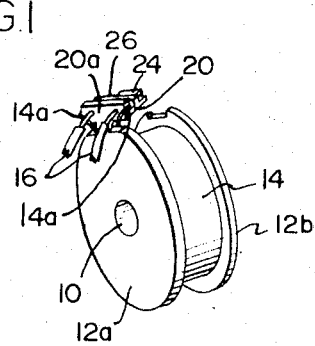
FIGURE 1 is a perspective view of one form of an electrical coil embodying the invention, with the integrally formed terminal mounting member partially spanning a coil wound on the bobbin.
Figure 2:
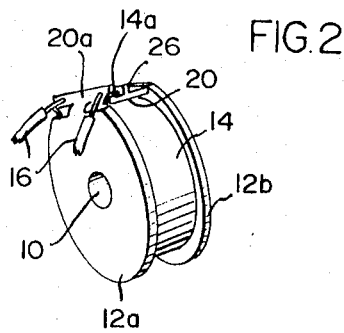
FIG. 2 is a perspective view similar to that of FIG. 1 with the integrally formed terminal mounting member completely spanning the wound coil and affixed to the end discs of the bobbin.

The electrical coil embodying the invention illustrated herein is especially designed to facilitate manipulation of the end wires of the coil for connection to terminal leads and positioning the same for subsequent encapsulation as referred to above. The novel integral terminal mounting means has many other useful applications for positioning and holding the winding end wires and the terminal leads for subsequent assembly in various electrical devices. The emphasis on encapsulation is but for illustrative purposes only to show how the end wires and terminal leads are easily manipulated and affixed to the integral mounting member for subsequent uses of the electrical coil.

Turning now to the drawings, an electrical coil is shown to have a bobbin configuration with a coil receiving central portion 10 (FIG. 4) and a pair of generally parallel end discs 12a, 12b at each end of the central portion 10 defining a coil receiving channel. A coil 14 is wound on the central portion of the coil from within the channel and has end wires 14a (FIGS. 6 and 7) for connection to appropriate terminal leads 16. A slot 18 (FIGS. 3 and 4) is formed on the inner surface of end disc 12a and extends outwardly from the central portion 10 to the periphery of disc 12a for receiving the inner end of the coil winding so that the inner winding end extends outwardly for connection with its appropriate terminal lead.

A terminal mounting member of connector plate 20 is formed integrally with the bobbin form for receiving and positioning the lead wires 16 for connection to their appropriate coil wires 14a. The bobbin form and its integral terminal mounting member 20 are preferably molded of plastic material such as nylon or Teflon.

The integral mounting member 20 preferably takes the form of a connector plate or flap extending generally diametrically from the end disc 12a (FIG. 4) to permit the coil winding 14 to be wound on the central portion 10 of the bobbin within the bobbin channel. The inner end wire of the wound coil extends outwardly adjacent the connector plate 20 through the slot 18 in the end disc 12a. The connector plate 20 includes a first rib 20a molded integrally therewith and protruding outwardly therefrom. The rib 20a extends generally tangentially of the end disc 12a and is provided with holes 20b for receiving the lead wires 16. The terminal mounting member or connector plate 20, being molded of plastic, is sufficiently flexible to permit the plate to be turned toward the opposite end disc 12b for engagement therewith spanning the bobbin channel with the wound coil 14 therein.

Figure 5:
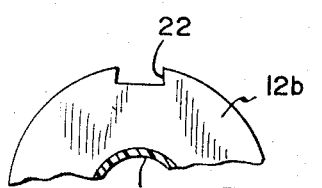
FIG. 5 is a partial section taken generally along the line 5—5 of FIG. 4.

A means is provided for securing the connector plate 20 to the opposite end disc 12b and includes a notch 22 (FIG. 5) which receives and holds a lip portion 24 (FIG. 3) of the terminal mounting member or connector plate 20. The walls of the notch 22 slightly diverge toward the central portion of the bobbin to provide a dovetail configuration within which the lip portion 24 of the mounting member 20 is snapped and held.

A second rib 26 is formed integrally with the connector plate 20 adjacent the first end wire receiving rib 20a and serves to affix the coil wires 14a to the connector plate 20. Since the rib 26 is made of plastic, a very effective and time saving means for affixing the coil wires 14a thereto is by heat sealing the wires so that the plastic flashes over portions of the wires thereby holding the wires to the rib 26. After the connector plate 20 is turned toward the end disc 12b and secured thereto by inserting the lip portion 24 thereof into the notch 22 in the end disc 12b, the coil wires 14a (which are drawn around the sides of the connector plate 20) are soldered to the terminal leads 16. It has been found that the soldering of the winding end wires 14a to the terminal leads 16 and the heat sealing of the wires to the rib 26 can be accomplished in a single operation.

Figure 7:
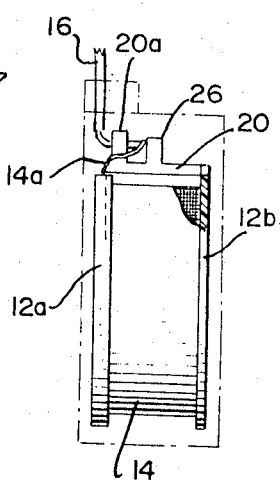
FIG. 7 is an elevation view taken generally in the direction of line 7—7 of FIG. 6 with the terminal leads connected to the end wires and illustrating in dotted lines the general configuration of an encapsulating material which may be employed as a casing surrounding and sealing the coil and mounting member.

In the preferred embodiment, the connector plate 20 extends outwardly from a slight recess 28 (FIG. 3) in the end disc 12a so that when the connector plate 20 is turned toward the end disc 12b and secured thereto, the connector plate does not extend diametrically beyond the periphery of the end disc 12b (FIG. 7).

Figure 3:
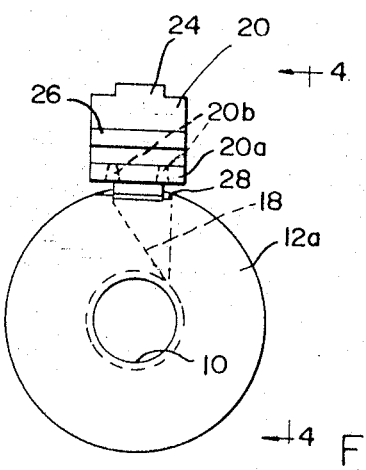
FIG. 3 is an elevation view of a bobbin embodying the invention before a coil is wound thereon.
Figure 4:
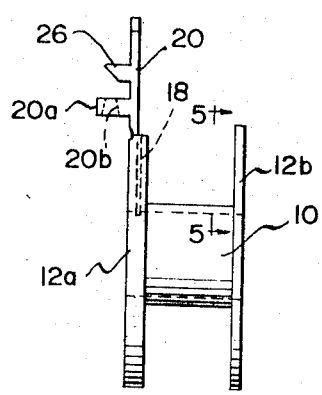
FIG. 4 is an elevation view taken generally in the direction of line 4—4 of FIG. 3.
Figure 6:
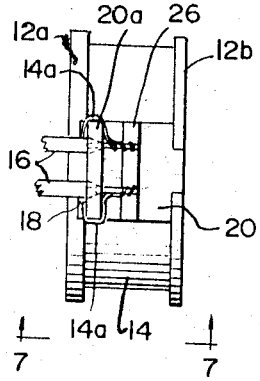
FIG. 6 is an elevation view similar to that of FIG. 4 with the coil wound on the bobbin and with the winding end wires received in the terminal mounting member in a position for connection to terminal leads.

In assembly, the bobbin and its integrally formed connector plate 20 initially take the form illustrated in FIGS. 3 and 4 with the connector plate 20 extending diametrically outwardly from the end disc 12a. The coil 14 is then wound on the central portion 10 of the bobbin with the inner winding end wire extending outwardly through the slot 18 in the inner surface of end disc 12a. After the coil is wound on the bobbin, the integral connector plate 20 is turned toward the end disc 20b spanning the bobbin channel with the wound coil therein and the lip portion 24 of the connector plate is snapped into the notch 22 from the end disc 12b. Either prior to or after the connector plate is turned into engagement with the end disc 12b, the lead wires 16 are inserted through the holes 20b in the connector plate rib 20a and are positioned to overlie the rib 26b as seen in FIG. 6. Then, the coil leads 16 are soldered to the end wires 14a and the end wires and lead wire ends are heat sealed to the rib 26 in a single step. The novel electrical coil is now ready for encapsulation or direct assembly (without encapsulation) into a variety of electrical devices. It can immediately be seen that by eliminating a separate mounting, tedious manipulation is eliminated and the connector plate is prepositioned for receiving the winding end wires and is easily turned to span the winding for connection with the opposite end disc 12b. Much labor and expense is thus avoided.

Referring to FIG. 7, the dotted lines illustrate a configuration of an encapsulating casing surrounding and sealing the coil and connector plate 20 as per the above mentioned patent and application. Facilitating such an encapsulating process is but one of the wide range of useful applications for the novel bobbin form electrical coil of this invention.

FIG. 13 shows a slightly modified form of the invention in which the holes 20b of the form of the invention shown in FIGS. 1 through 7 have been replaced with a pair of notches 20c in which the lead wires 16 are layed so that their exposed ends are positioned on the rib 26 (FIG. 7) for affixing the coil wires thereto and heat sealing the exposed ends of the lead wires and the coil wires to the rib 26.

FIGS. 8 through 11 show another form of bobbin embodying the invention, with the same numerals designating the elements identified in FIGS. 1 through 7. In this form, the means for securing the connector plate 20 to end disc 12b includes an aperture 30 (FIGS. 10–12) in end disc 12b, which receives and holds the lip portion 24 of the hingedly supported terminal mounting member or connector plate 20. The end disc 12b, being made of plastic material, will give outwardly in the direction of arrow A (FIG. 10) as the lip portion 24 is forced against the periphery 32 of end disc 12b so that the lip portion 24 of the mounting member 20 can be snapped into aperture 30 and held therein.

The terminal mounting member or connector plate 20 shown in FIGS. 8–11 includes a terminal receiving loop portion 34 molded integrally therewith and protruding therefrom. The loop portion 34 extends outwardly in the plane of the end disc 12a and forms an aperture 34a for receiving the terminal lead wires 16 as illustrated in FIG. 12. Referring particularly to FIGS. 8, 9 and 12, a separating boss 38 having diverging side walls is molded integrally with connector plate 20 and extends outwardly therefrom in a direction radial of the bobbin. The boss 38 is disposed between the terminal receiving loop 34 and rib 26 and, as viewed in FIG. 9, is centrally aligned with the loop aperture 34a. In assembly, the terminal lead wires 16 are inserted through loop 34 in the direction of arrow B (FIG. 12) whereupon the two lead wires will engage the boss and separate with the leads being forced to opposite sides of the separating boss 38. The lead wires are thereby positioned in a spaced relationship along rib 26 and terminal leads are heat sealed thereto when the winding end wires are soldered to the lead wires.

FIGS. 14 through 18 show a further form of bobbin embodying the invention, with the same numeral designating any common elements identified in FIGS. 1 through 13. In this form of the invention, the means for securing the connector plate 20 to end disc 12b is the same as that shown in FIGS. 8 through 11.

The terminal mounting member or connector plate 20 shown in FIGS. 14 through 18 includes a terminal receiving boss, generally designated 40, molded integrally therewith and protruding generally perpendicularly therefrom. The terminal receiving boss 40 has a recess 42 (FIGS. 15 and 18) for receiving the terminal leads 16. The boss has a pair of slits 44 through which the exposed ends of the terminal leads 16 can protrude when the terminal leads are inserted into the recess 42 in a manner shown in FIGS. 14, 17 and 18. The exposed ends of the terminal leads 16 protrude through the slits 44 a sufficient distance to permit the winding end wires 14a to be affixed thereto with the exposed ends of the terminal leads and the affixed end wires overlying the terminal mounting member 20. In assembly, after the coil 14 is wound on the central portion 10 of the bobbin and the connector plate 20 is snapped into the aperture 30, the exposed ends of the terminal lead wires 16 are bent at right angles to the remainder of the lead wires and the lead wires are inserted into the recess 42 of the terminal receiving boss 40 with the exposed ends of the lead wires protruding through the slits 44 and overlying the connector plate 20. The winding end wires 14a are then affixed to the exposed ends of the lead wires and the exposed ends of the lead wires and the winding end wires are heat sealed to the top of the connector plate 20 when the winding end wires are soldered to the lead wires.

The foregoing detailed description is given for clearness of understanding only and no unnecessary limitations are to be understood therefrom, as some modifications will be obvious to those skilled in the art.

I claim:

1. In an electrical coil having a bobbin configuration with a coil receiving central portion and a pair of generally parallel end discs at either end of the central portion defining a coil receiving channel, a coil wound on the central portion of said coil form within said channel and having end wires for connection to appropriate terminal leads, the improvement comprising: a connector plate formed integrally with one of said end discs and movable between a first position extending outwardly to permit a coil to be wound within said channel and a second position extending toward the other end disc for engagement therewith, spanning said channel with the wound coil therein, the connector plate having means for receiving said end wires from a wound coil; and means on said other end disc for securing the connector plate thereto.

2. The electrical coil of claim 1 wherein said last-named means include a notch in the periphery of said other end disc for receiving and holding a lip portion of said connector plate.

3. The electrical coil of claim 1 wherein said connector plate is made of plastic and wherein said end wires are affixed thereto by heat sealing the leads to a portion thereof.

4. The electrical coil of claim 1 wherein said connector plate is generally flat and has a rib protruding therefrom generally tangentially of said end disc, the rib having holes therethrough for receiving said terminal leads.

5. The electrical coil of claim 4 wherein said connector plate is made of plastic and includes a second rib to which said winding end wires are affixed by heat sealing the wires to said second rib.

6. The electrical coil of claim 1 wherein said connector plate extends generally diametrically away from said one end disc before said coil is wound on said bobbin central portion.

7. The electrical coil of claim 1 wherein said last-named means includes an aperture in said other end disc for receiving and holding a lip portion of said connector plate.

8. The electrical coil of claim 1 wherein said connector plate is generally flat and has a loop portion protruding therefrom generally in the plane of said end disc, the loop portion having an aperture receiving said terminal leads.

9. The electrical coil of claim 8 wherein said connector plate includes a separating boss spaced inwardly from said loop portion and aligned with said aperture separating the terminal leads.

10. The electrical coil of claim 9 wherein said connector plate is made of plastic and includes a rib protruding therefrom on the side of said separating boss opposite said loop portion, said winding end wires being affixed by heat sealing to said rib.

11. The electrical coil of claim 9 wherein said separating boss has diverging side walls engageable with the ends of said terminal leads to separate the terminal leads as they are passed through said loop portion.

12. In an electrical coil having a bobbin configuration with a coil receiving central portion and a pair of generally parallel and discs at either end of the central portion defining a coil receiving channel, a coil wound on the central portion of said coil form within said channel and having end wires for connection to appropriate terminal leads, the improvement comprising: a connector plate formed integrally with one of said end discs and movable between a first position extending outwardly to permit a coil to be wound within said channel and a second position extending toward the other end disc for engagement therewith, spanning said channel with the wound coil therein, the connector plate having means for receiving said terminal leads in position for connection to the end wires from the wound coil; and means on said other end disc for securing the connector plate thereto.

13. The electrical coil of claim 12 wherein said connector plate is made of plastic and wherein said terminal leads and end wires are affixed thereto by heat sealing the terminal leads and end wires to a portion thereof.

14. In an electrical coil having a bobbin configuration with a coil receiving central portion and a pair of generally parallel end discs at either end of the central portion defining a coil receiving channel, a coil wound on the central portion of said coil form within said channel and having end wires for connection to appropriate terminal leads, the improvement comprising: a connector plate formed integrally with one of said end discs and movable between a first position extending outwardly to permit a coil to be wound within said channel and a second position extending toward the other end disc for engagement therewith, spanning said channel with the wound coil therein, the connector plate having at least a portion thereof made of plastic and wherein at least one of said terminal leads and said end wires are affixed thereto by heat sealing to said portion; and means on said other end disc for securing the connector plate thereto.

15. The electrical coil of claim 14 wherein said terminal leads are soldered to said end wires in such a manner as to cause them to be heat sealed to said portion of the connector plate.

References Cited

UNITED STATES PATENTS 2,992,370   7/1961   Lavinana _____ 336—197 X

LEWIS H. MYERS, *Primary Examiner.*

E. A. GOLDBERG, *Assistant Examiner.*

U.S. Cl. X.R.

336—198